(12) United States Patent
Netzer

(10) Patent No.: US 11,131,394 B2
(45) Date of Patent: Sep. 28, 2021

(54) CLOSURE DEVICE MOUNTED TO A CYLINDER-PISTON DRIVE UNIT DISPLACEABLE YOKE

(71) Applicant: VAT HOLDING AG, Haag (CH)

(72) Inventor: Martin Netzer, Bludenz (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 16/332,518

(22) PCT Filed: Sep. 26, 2017

(86) PCT No.: PCT/EP2017/074354
§ 371 (c)(1),
(2) Date: Mar. 12, 2019

(87) PCT Pub. No.: WO2018/077553
PCT Pub. Date: May 3, 2018

(65) Prior Publication Data
US 2019/0285184 A1 Sep. 19, 2019

(30) Foreign Application Priority Data
Oct. 24, 2016 (AT) .................................. A 491/2016

(51) Int. Cl.
*F16K 3/02* (2006.01)
*F16K 51/02* (2006.01)
*F16K 27/04* (2006.01)

(52) U.S. Cl.
CPC .......... *F16K 3/0254* (2013.01); *F16K 27/041* (2013.01); *F16K 51/02* (2013.01)

(58) Field of Classification Search
CPC ....... F16K 3/0254; F16K 51/02; F16K 27/041

USPC .................................. 251/326–329, 62–63.6
See application file for complete search history.

(56) References Cited

U.S. PATENT DOCUMENTS

| | | | | |
|---|---|---|---|---|
| 1,738,567 | A | * 12/1929 | Flodin | ...................... B21K 1/24 |
| | | | | 29/890.132 |
| 2,787,439 | A | * 4/1957 | Bredtschneider | ..... F16K 27/047 |
| | | | | 251/329 |
| 2,998,220 | A | 8/1961 | Grieselhuber | |
| 3,425,322 | A | 2/1969 | Zucchellini | |
| 4,285,494 | A | 8/1981 | Sturgeon | |

(Continued)

FOREIGN PATENT DOCUMENTS

| | | |
|---|---|---|
| CN | 1277333 | 12/2000 |
| CN | 102165232 | 8/2011 |

(Continued)

*Primary Examiner* — John Bastianelli
(74) *Attorney, Agent, or Firm* — Volpe Koenig

(57) ABSTRACT

A closure device (1) for an opening (2) in a chamber wall (3) is provided, wherein the closure device (1) has at least one closure element (4) and at least one closure element carrier body (5) and at least one yoke (6). The closure element (4) is fixedly connected to the yoke (6) by the closure element carrier body (5), wherein the yoke (6) is mounted in a housing (9) of the closure device (1) in such a way that the yoke can be slid by at least one cylinder-piston drive unit (7) of the closure device (1), in particular parallel to a longitudinal extent (8) of the closure element carrier body (5). The yoke (6) has at least one cylinder cavity (10) of the cylinder-piston drive unit (7) and/or at least one guide element receptacle (11) for guiding a guide element (12) of the closure device (1).

13 Claims, 4 Drawing Sheets

(56) References Cited

U.S. PATENT DOCUMENTS

| | | | |
|---|---|---|---|
| 4,335,733 A | 6/1982 | Richards | |
| 4,721,282 A * | 1/1988 | Shawver | F16K 51/02 251/158 |
| 6,299,133 B2 * | 10/2001 | Waragai | F16K 3/0254 251/193 |
| 6,390,449 B1 * | 5/2002 | Ishigaki | F16K 3/184 251/193 |
| 7,445,019 B2 * | 11/2008 | Brenes | F16K 51/02 137/315.29 |
| 7,500,649 B2 * | 3/2009 | Litscher | F16K 3/0254 251/326 |
| 8,474,791 B2 * | 7/2013 | Ogawa | F16K 3/184 251/203 |
| 8,672,293 B2 | 3/2014 | Ehrne et al. | |
| 8,800,956 B2 * | 8/2014 | Ishigaki | F16K 3/16 251/58 |
| 8,870,156 B2 * | 10/2014 | Zingsem | F16K 3/0281 251/249.5 |
| 8,960,641 B2 | 2/2015 | Blecha | |
| 2015/0308584 A1 | 10/2015 | Ehrne et al. | |
| 2016/0003363 A1 | 1/2016 | Blecha et al. | |
| 2017/0009892 A1 | 1/2017 | Ehrne et al. | |

FOREIGN PATENT DOCUMENTS

| | | |
|---|---|---|
| CN | 104781599 | 7/2015 |
| EP | 2878870 | 6/2015 |
| GB | 2254658 | 10/1992 |
| WO | 2015139818 | 9/2015 |

\* cited by examiner

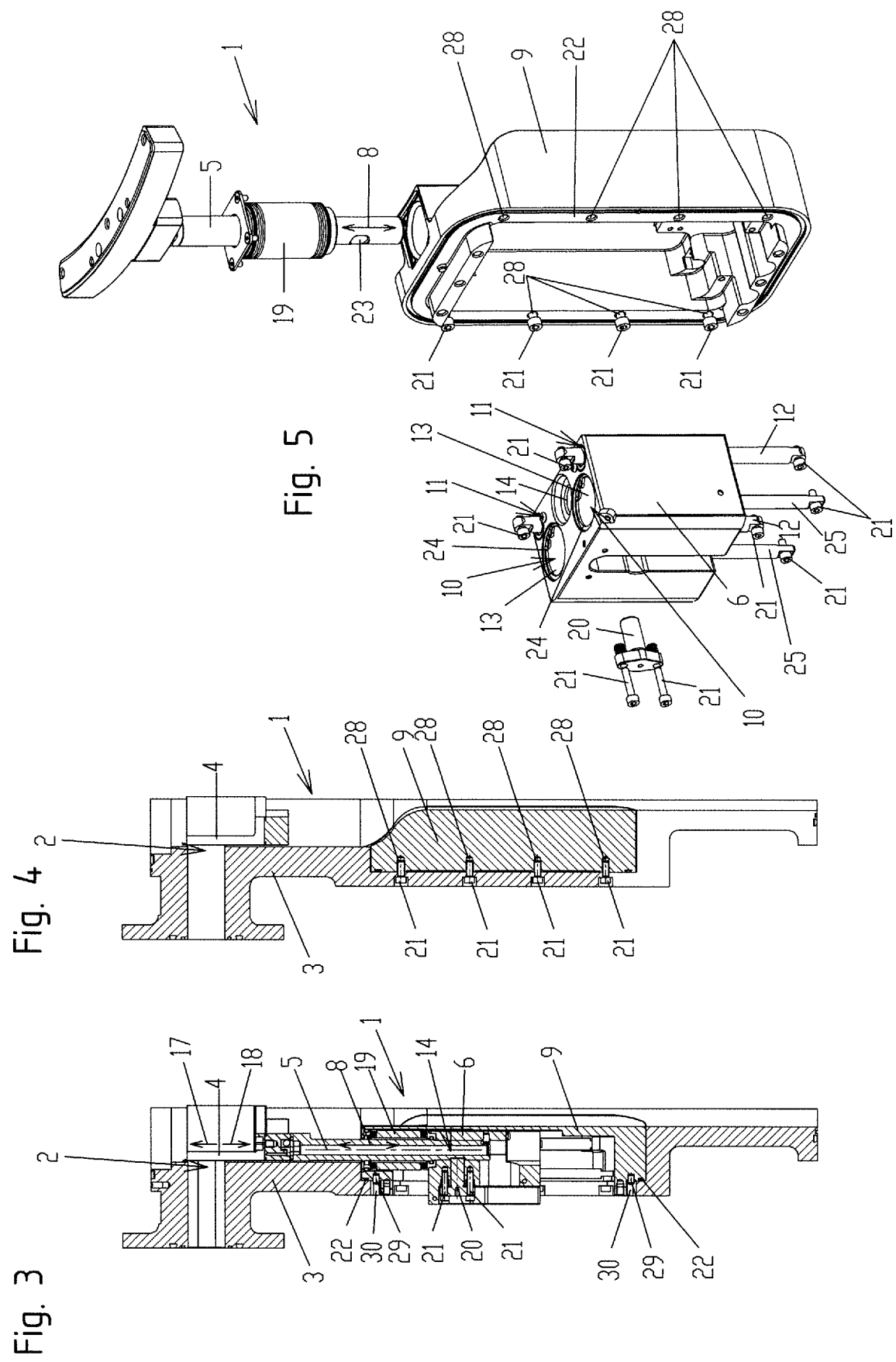

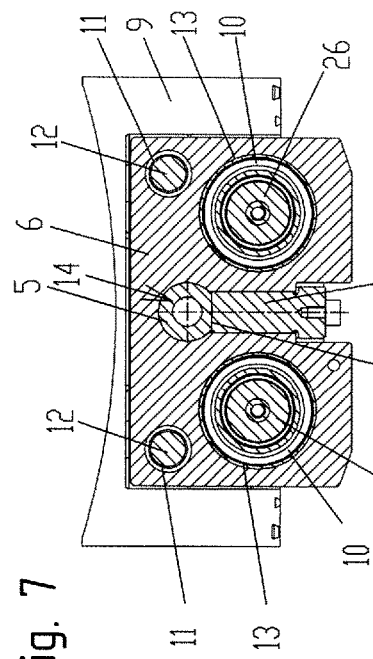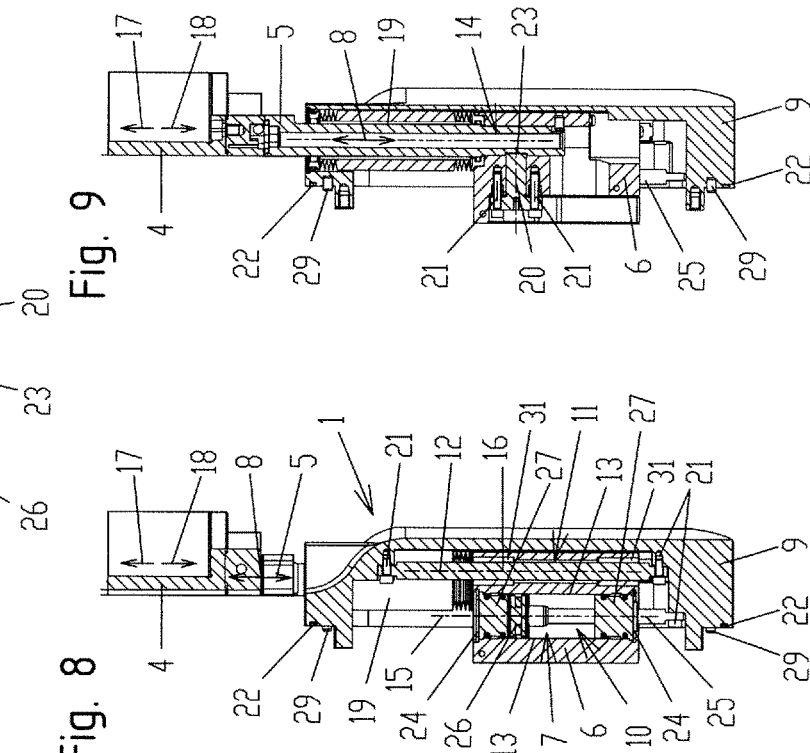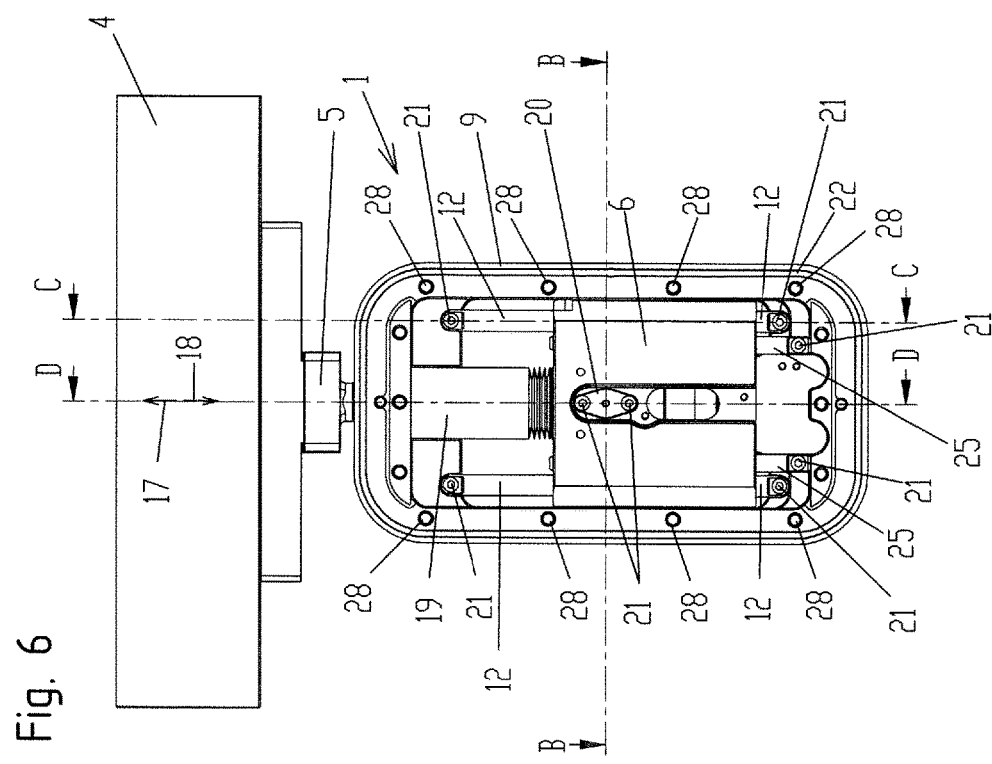

CLOSURE DEVICE MOUNTED TO A CYLINDER-PISTON DRIVE UNIT DISPLACEABLE YOKE

BACKGROUND

The present invention relates to a closure device for an opening in a chamber wall, wherein the closure device has at least one closure member and at least one closure member carrier body and at least one yoke, and the closure member is rigidly connected to the yoke via the closure member carrier body, wherein the yoke is mounted in a housing of the closure device so as to be displaceable by at least one cylinder-piston drive unit of the closure device, in particular parallel to a longitudinal extent of the closure member carrier body.

Closure devices of this type are disclosed, for example, in WO 2015/139818 A1.

SUMMARY

It is an object of the invention to improve generic closure devices to the effect that, on the one hand, they can be produced in as cost-effective a manner as possible and, on the other hand, the closure member is guided with a high degree of precision.

To achieve this object, the invention provides, in closure devices of the aforementioned type, that the yoke has at least one cylinder cavity of the cylinder-piston drive unit and/or at least one guide element receptacle for guiding a guide element of the closure device.

In other words, it is thus a basic idea of the invention for the cylinder cavity of the cylinder-piston drive unit and/or the guide element receptacle to be equally co-integrated into the yoke. The guide element is displaceably mounted in the guide element receptacle. By virtue of the invention, for the purpose of a cost-effective design, at first a reduction of the individual parts required for the closure device is achieved. Moreover, this can also result in the creation of a very compact unit which requires a small installation space. Above all, however, the integration into the yoke achieves a very direct incorporation of the cylinder cavity of the cylinder-piston drive unit and/or of the guide element receptacle into the yoke. This direct incorporation means that only very small tolerances have to be taken into consideration, which leads overall to a very precise guiding of the closure member.

In the course of the invention, it is possible that at least one cylinder cavity wall, which surrounds the at least one cylinder cavity, of the yoke and a carrier body receptacle of the yoke for fixing the closure member carrier body on the yoke are arranged in a fixed spatial position with respect to one another in the yoke. Moreover, a situation can also be achieved in which the at least one guide element receptacle and the carrier body receptacle are arranged in a fixed spatial position with respect to one another in the yoke.

It is usually the case that closure devices according to the invention have only one closure member carrier body. However, it is of course also possible that closure devices according to the invention have two or more closure member carrier bodies.

With particular preference, there is provision that the yoke is designed as a one-piece body. In order to achieve this, there can be provision, for example, that the yoke is designed as a cast body or as an injection-molded body or as a body which is forged from a block or worked therefrom in some other way, for example by machining. The cylinder cavity of the cylinder-piston drive unit that is arranged in the yoke is cylindrical at least in certain portions. The cylinder cavity can be a through-opening in the yoke that is open on both sides. However, the cylinder cavity can also be closed on one side by the yoke itself, for example if the cylinder cavity is formed in the manner of a blind hole. In order to close the open ends of the cylinder cavity, use can be made of separate cylinder closure bodies, where appropriate held by a securing ring or the like.

The guide element receptacle is advantageously a through-opening in the yoke that is open on both sides. As a result, it is possible for the guide element, which is guided by the guide element receptacle or is displaceably mounted in the guide element receptacle, to be fixed at its two ends, for example on the housing of the closure device. In principle, however, it would also be conceivable that, in the case of guide elements fixed only on one side, the guide element receptacle is configured as a type of blind hole in the yoke that is closed on one side. In its cross section, the guide element receptacle is advantageously adapted to the outer contour of the guide element. A circular cylindrical configuration of the guide element receptacle also lends itself here. The guide element is in any case advantageously fixedly fastened to the housing. The guide element is advantageously an inherently rigid, preferably elongated component which is designed, for example, as a rod or rail at least in certain regions.

The closure member carrier body, that is to say the connection between closure member and yoke, is advantageously likewise designed to be elongated. In preferred embodiments, the yoke, and preferably hence also the closure member carrier body and the closure member, are displaced parallel to the longitudinal extent of the closure member carrier body if the closure member is moved back and forth from an open position, in which it at least partially, preferably completely, opens the opening in the chamber wall, and a closed position in which it closes the opening in the chamber wall. It is clear here that what is meant by the longitudinal extent is a direction of the longitudinal extent, that is to say in other words a longitudinal extent direction of the closure member carrier body. The closure member carrier body is also advantageously designed as a rod or rail at least in certain regions. The closure member carrier body and/or the guide element are or is advantageously designed to be rectilinear, that is to say not curved.

The yoke preferably projects on both sides laterally beyond the closure member carrier body. In other words, there is advantageously provision that the extent of the yoke transversely to the longitudinal extent of the closure member carrier body is greater than the width of the closure member carrier body in this transverse direction.

In principle, it is possible that the yoke has only a single cylinder cavity and/or a single guide element receptacle. In preferred embodiments, however, there is provision that the yoke has a plurality of cylinder cavities of cylinder-piston drive units and/or a plurality of guide element receptacles. Particularly preferred variants provide that the yoke has, preferably exactly, two cylinder cavities of two cylinder-piston drive units of the closure device and/or, preferably exactly, two guide element receptacles for guiding in each case a guide element of the closure device. It is advantageous here in turn if the cylinder cavities are arranged axis-symmetrically to one another and/or the guide element receptacles are arranged axis-symmetrically to one another. These symmetries can achieve a particularly precise guiding of the closure member. The axes of symmetry of the cylinder cavities and of the guide element receptacles can lie in a common plane or are preferably arranged parallel to one another. The cylinder cavity is in any case the cavity of the cylinder-piston drive unit in which the piston of the cylinder-piston drive unit is displaceably mounted and is charged with pressure. The piston can in each case be arranged fixedly on the housing of the closure device by a corresponding piston rod. The cylinder cavity is mounted displaceably with the yoke.

With particular preference, there is provision that the cylinder cavity or each of the cylinder cavities has a cavity longitudinal axis, and this cavity longitudinal axis is arranged parallel to the longitudinal extent of the closure member carrier body. It is also advantageous if the guide element receptacle or each of the guide element receptacles has a guide element receptacle longitudinal axis, and this guide element receptacle longitudinal axis is arranged parallel to the longitudinal extent of the closure member carrier body. In a combination thereof, the result is then that the guide element receptacle longitudinal axis and the cavity longitudinal axis are also arranged parallel to one another.

It should be noted with respect to the here repeatedly used term "longitudinal axis" that what is concerned here is an axis of the longitudinal extent, with the longitudinal extent meaning the longest extent, that is to say the direction of the largest extent of the respective body.

In principle, there can be provision that the closure device according to the invention is designed as a so-called L-valve. This means that the closure member is moved in two mutually angled, preferably orthogonal, directions between its completely open position and its closed position. However, with particular preference, the invention is used in closure devices in which the closure member is mounted in the housing of the closure device so as to be displaceable relative to the opening exclusively linearly and exclusively in two mutually opposite directions. In other words, there is provision in these preferred variants that the closure member is moved back and forth exclusively linearly, with the movement directions always being parallel to a single straight line.

The closure member of the closure device according to the invention can, in principle, be designed in a wide variety of forms. The closures can be so-called needle closures or the like for opening and closing relatively small openings in the corresponding chamber wall. However, preferred variants of the closure device provide that the latter is suitable for closing openings of planar design in chamber walls. Correspondingly, the closure member is also advantageously of planar design. It can be, for example, a planar or curved plate or a correspondingly formed closure disk. The closure member can be sealed in the closed position against a valve seat. However, the closure member, in the closed position, can also only cover the opening without sealing. In such a non-sealed embodiment, a closure member of planar design can also be referred to as a closure shield.

The closure device according to the invention could also be referred to as a valve. In particular, closure devices according to the invention can be used when operating states which are run at a lower pressure level than the surrounding pressure can be set in the process chamber of which the opening is closed and opened by the closure device. Thus, in other words, closure devices according to the invention are particularly preferably used in negative pressure or vacuum processes. What is meant by vacuum here is if operating states with pressures of less than or equal to 0.001 mbar or 0.1 Pascal are reached. If closure devices according to the invention are designed for use under such conditions, they can also be referred to as vacuum valves.

BRIEF DESCRIPTION OF THE DRAWINGS

Further preferred features and details of how the invention can be implemented are explained by way of example below with reference to an exemplary embodiment shown in the figures, in which:

FIG. 3 shows the section along the section line A-A from FIG. 2;

FIG. 4 shows the section along the section line X-X from FIG. 2;

FIG. 5 shows an exploded illustration of parts of the closure device shown here;

FIG. 6 shows a view of the closure device of this exemplary embodiment in the open position of the closure member;

FIG. 7 shows the section along the section line B-B illustrated in FIG. 6;

FIG. 8 shows the section along the section line C-C illustrated in FIG. 6;

FIG. 9 shows the section along the section line D-D illustrated in FIG. 6;

DETAILED DESCRIPTION

Figure 2:
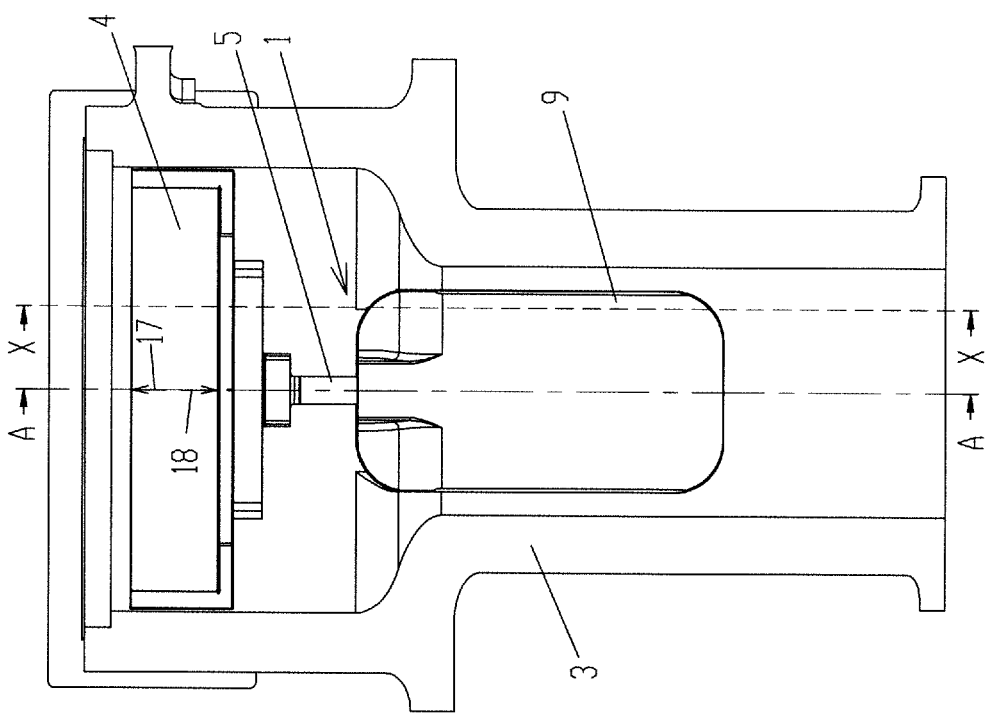
FIGS. 1 and 2 show illustrations which show an exemplary embodiment of the invention in a fastened state on a chamber wall.
Figure 1:
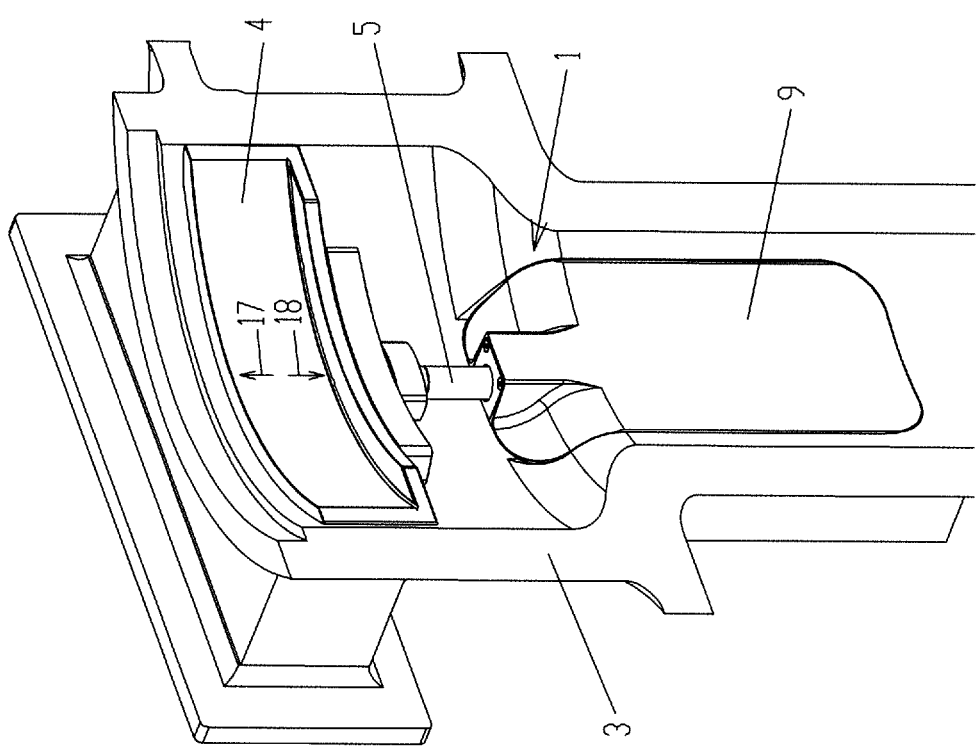

FIG. 1 shows in a perspective illustration how the exemplary embodiment, shown here in all figures, of a closure device 1 according to the invention is fastened to the chamber wall 3 and closes the opening 2 by way of its closure member 4. FIG. 2 shows a plan view, FIG. 3 shows the section along the section line A-A from FIG. 2 and FIG. 4 shows the section along the section line X-X from FIG. 2.

In the closed positions illustrated in FIGS. 1 to 4, the closure member 4 completely covers the opening 2 in the chamber wall 3. In the exemplary embodiment shown, the closure member 4 is a closure shield which, although completely covering the opening 2 in the closed position, is not sealed against the chamber wall surrounding the opening. Of course, the invention could also be realized with closure members 4 in which the closure member, in the closed position, is sealed against a valve seat surrounding the opening by corresponding seals.

In order to bring the closure member 4 from the closed position shown in FIGS. 1 to 4 into the maximum opening position in which it completely or partially opens the opening 2, the closure member 4 is moved linearly in the direction 18 in the exemplary embodiment shown here. During this movement, the closure member carrier body 5, which is designed here as a rod at least in certain regions, is retracted into the housing 9, said body correspondingly taking along the closure member 4 in the direction 18. In order then to close the opening 2 again, the closure member 4 is moved in the direction 17, that is to say in the opposite direction to the direction 18, until the closed position according to FIGS. 1 to 3 is reached again. The closure device 1 shown here in the exemplary embodiments is of the type in which the closure member 4 is mounted in the housing 9 of the closure device 1 so as to be displaceable relative to the opening 2 exclusively linearly and exclusively in two mutually opposite directions 17 and 18.

The housing 9 of the closure device 1 has threaded holes 28. As illustrated in FIG. 4, the housing 9, and hence the entire closure device 1, can be screwed to the chamber wall 3 by screws 21. As a result, a seal (not shown here) arranged in the sealing duct 22 is pressed against the chamber wall 3 such that the housing 9 is sealed against the chamber wall 3. Here, the centering pins 29 of the housing 9, which are clearly visible in FIGS. 3, 8, 9, 11 and 12, engage in corresponding centering bores 30 of the chamber wall 3, whereby the housing 9 is automatically correctly positioned during mounting on the chamber wall 3.

It can clearly be seen in FIG. 3 how the closure member carrier body 5, which is designed here to be rod-shaped at least in certain regions, connects the closure member 4 to the yoke 6. In the exemplary embodiment shown, the closure member 4 is, for this purpose, screwed fixedly on the closure member carrier body 5. To connect the closure member carrier body 5 to the yoke 6, the yoke 6 has a carrier body receptacle 14 into which the lower end of the closure member carrier body 5 is inserted during mounting. In the exemplary embodiment shown here, the closure member carrier body 5 is fixed in the yoke 6 by the carrier body fixing 20, which is screwed on the yoke by the screws 21 and engages in the depression 23 of the closure member carrier body 5. If the carrier body fixing 20 is screwed on the yoke 6, as shown, for example, in FIG. 3, the closure member carrier body 5 is thereby fixed in the carrier body receptacle 14 and hence on the yoke 6.

In the exploded illustration according to FIG. 5, the yoke 6 designed according to the invention of the exemplary embodiment shown here of a closure device 1 according to the invention can be particularly clearly seen in terms of its structure. In the variant chosen here, the yoke 6 has two cylinder cavities 10 and also two guide element receptacles 11. Each of the cylinder cavities 10 is part of a cylinder-piston drive unit 7, as will be explained in more detail below with reference to FIGS. 7 and 11. The guide element receptacles 11 arranged in addition to the cylinder cavities 10 in the yoke 6 are configured as through-bores, with the result that the guide elements 12, which are designed here in a rod-shaped manner, can be guided through them. In the sectional illustrations according to FIGS. 8 and 11, it can clearly be seen that the rod-shaped guide elements 12 in this exemplary embodiment are fixed on the housing 9 by screws 21. The yoke 6 is guided in a linearly displaceable manner on these guide elements 12 via the guide element receptacles 10. For the purpose of a guidance of the yoke 6 on the guide elements 12 that is as play-free and exact as possible, it is possible in preferred embodiments, like that shown here, to provide guide sleeves 31 which are inserted into the guide element receptacles 11, as is particularly clearly visible in FIGS. 8 and 11.

Returning to FIG. 5, it should be noted that, in the embodiment shown here, and also in other preferred embodiments, the yoke 6 is designed as a one-piece body. As already explained at the outset, it can be, for example, a cast body, an injection-molded body or a body which is forged from a block or worked therefrom in some other way.

The integration of the cylinder cavities 10 and of the guide element receptacles 11 into the yoke 6 means that these components are situated in a fixed geometric position to one another, which leads, on the one hand, to the closure device 1 according to the invention being realized in a cost-effective manner with few parts. On the other hand, this has the advantage that there is automatically achieved a very precise guidance of the closure member carrier body 5, and hence also of the closure member 4, during the movements in the directions 17 and 18. In the exemplary embodiment shown here, this effect is further improved in that the carrier body receptacle 14 is also directly concomitantly realized in the yoke 6. This, too, can clearly be seen in FIG. 5.

In the exemplary embodiment shown, a bellows seal 19 is present which seals the closure member carrier body 5, which is elongated in the direction of the longitudinal extents 8, against the housing 9. This bellows seal 19 can be clearly seen in FIGS. 3, 5, 6, 8, 9, 10, 11 and 12.

Figure 10:
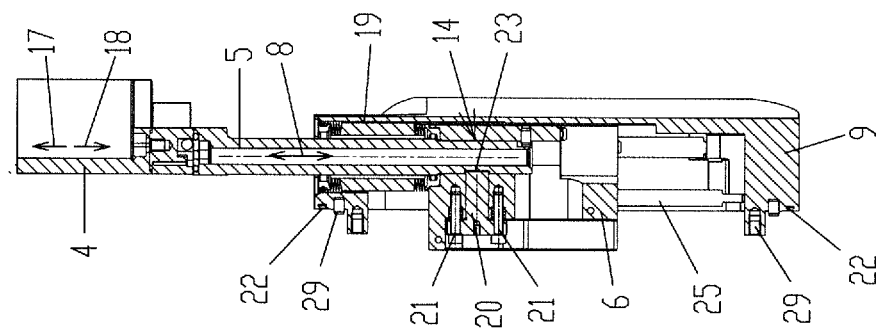
FIG. 10 shows a view of the closure device, with the closure member situated in the closed position.
Figure 11:
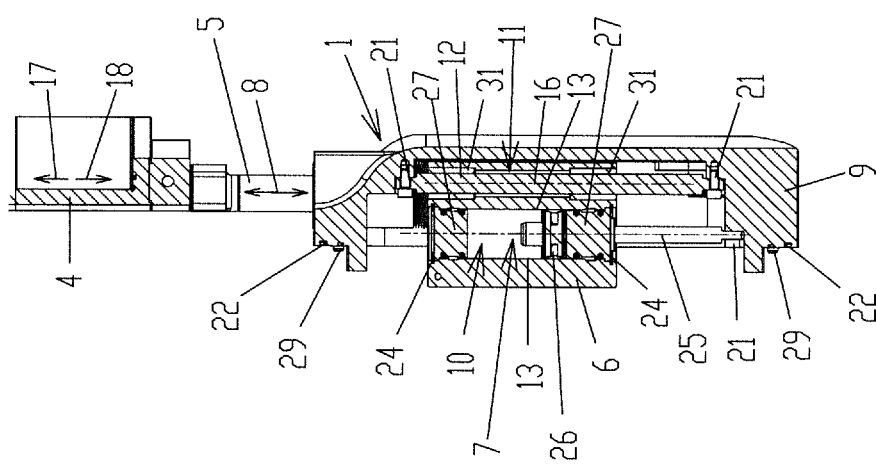
FIG. 11 shows the section along the section line E-E from FIG. 10.
Figure 12:
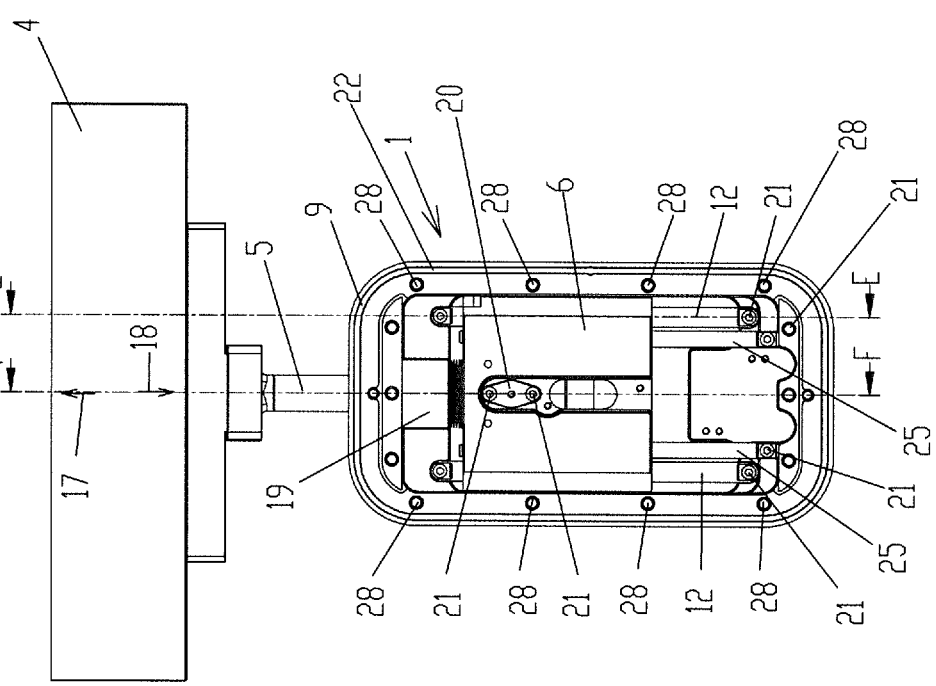
FIG. 12 shows a section along the section line F-F from FIG. 10.

In FIGS. 6, 8, 9 and 10 to 12, the closure device 1 of this exemplary embodiment is in each case illustrated as being released from the chamber wall 3. FIGS. 6, 8 and 9 show the closure member 4 in the open position, in which it completely opens the opening 2 in this exemplary embodiment, and the closure member carrier body 5 is retracted into the housing 9 in the direction 18, that is to say here also in a direction parallel to its longitudinal extent 8. FIGS. 10, 11 and 12 show the closed position, in which the closure member 4 is extended upward in the direction 17, that is to say likewise in a direction parallel to the longitudinal extent 8, in order thereby to completely cover the opening 2.

FIG. 7 shows the section along the section line B-B according to FIG. 6 and hence a horizontal section through the yoke 6, which is designed here in one piece, having the two cylinder cavities 10 each surrounded by a cylinder cavity wall 13 and the two guide element receptacles 11 through each of which a guide element 12 is guided. FIG. 7 also clearly shows the fastening of the closure member carrier body 5 by means of the carrier body fixing 20 in the carrier body receptacle 14 of the yoke 6. In each of the cylinder cavities 10 can be seen a section through a piston 26, which is arranged in each case in the cylinder cavity 10, of the respective cylinder-piston drive unit 7. Also clearly visible in FIG. 7 is the axis-symmetrical arrangement of the here in each case doubly present cylinder cavities 10 and guide element receptacles 11.

The cylinder-piston drive units 7, which can each be configured to be pneumatic or hydraulic and ensure the movement of the yoke 6 together with closure member carrier body 5 and closure member 4 in the directions 17 and 18, can be seen particularly clearly in the sectional illustrations according to FIGS. 8 and 11. It can first be seen in these sectional illustrations that, in this exemplary embodiment, the cylinder cavities 10 integrated into the yoke 6 are designed as through-bores or through-openings. They are each circular cylindrical. To close the upper and lower end of the respective cylinder cavity 10, in the exemplary embodiment shown there is in each case provided a cylinder closure body 27 which is fixed in its position by a respective securing ring 24. The piston rod 25 is in each case guided through the lower cylinder closure body 27. This piston rod is fixed at one end of the housing 9, here by a screw 21. At the other end, the piston rod 25 bears the piston 26 arranged in the cylinder cavity 10. As a result of the piston rod 25 being fastened to the housing 9, the piston 26 is mounted fixedly on the housing in this exemplary embodiment. The pressurization of the working chambers remaining between the piston 26 and the cylinder closure bodies 27 can occur in a manner known per se by liquid or gaseous pressure media, such as, for example, oil or air. The supply lines and discharge lines and also valves for the pressure medium that are necessary for this purpose are not illustrated here, but can be configured as known per se in the prior art. In any case, as a result of the piston fastened rigidly to the housing, corresponding pressurization causes the yoke 6, and hence the closure member 4, to move in the directions 17 and 18 and thus parallel to the longitudinal extent 8.

In the exemplary embodiment shown, the cavity longitudinal axes 15 of the cylinder cavities 10 are oriented parallel to the longitudinal extent 8 of the closure member carrier 5. The same applies to the guide element receptacle longitudinal axes 16 of the guide element receptacles 11. Thus, in this exemplary embodiment, the directions 17, 18, the longitudinal extent 8, the cavity longitudinal axes 15 and also the guide element receptacle longitudinal axes 16 are all parallel to one another.

KEY TO THE REFERENCE NUMBERS

1 Closure device
2 Opening
3 Chamber wall
4 Closure member
5 Closure member carrier body
6 Yoke
7 Cylinder-piston drive unit
8 Longitudinal extent
9 Housing
10 Cylinder cavity
11 Guide element receptacle
12 Guide element
13 Cylinder cavity wall
14 Carrier body receptacle
15 Cavity longitudinal axis
16 Guide element receptacle longitudinal axis
17 Direction
18 Direction
19 Bellows seal
20 Carrier body fixing
21 Screw
22 Sealing duct
23 Depression
24 Securing ring
25 Piston rod
26 Piston
27 Cylinder closure body
28 Threaded holes
29 Centering pin
30 Centering bore
31 Guide sleeve

The invention claimed is:

1. A closure device for an opening in a chamber wall, the closure device comprising:
 a closure member,
 a closure member carrier body,
 a yoke,
 a housing,
 a cylinder-piston drive unit,
 the closure member is rigidly connected to the yoke via the closure member carrier body, the yoke is mounted in the housing of the closure device so as to be displaceable by the cylinder-piston drive unit, the yoke has at least one cylinder cavity of the cylinder-piston drive unit and at least one guide element receptacle for guiding a guide element of the closure device.

2. The closure device as claimed in claim 1, wherein the cylinder cavity of the yoke comprises two cylinder cavities, and the cylinder-piston drive unit comprises two cylinder-piston drive units.

3. The closure device as claimed in claim 2, wherein the cylinder cavities are arranged axis symmetrically to one another.

4. The closure device as claimed in claim 1, wherein the yoke is formed as a one-piece body.

5. The closure device as claimed in claim 4, wherein the yoke comprises a cast body or an injection-molded body or a body forged or worked from a block.

6. The closure device as claimed in claim 1, wherein the cylinder cavity is defined by a cylinder cavity wall of the yoke, and the cylinder cavity wall and a carrier body receptacle of the yoke that fixes the closure member carrier body on the yoke are arranged in a fixed spatial position with respect to one another in the yoke.

7. The closure device as claimed in claim 1, wherein the cylinder cavity has a cavity longitudinal axis, and said cavity longitudinal axis is arranged parallel to a longitudinal extent of the closure member carrier body.

8. The closure device as claimed in claim 1, wherein the guide element receptacle has a guide element receptacle longitudinal axis, and said guide element receptacle longitudinal axis is arranged parallel to a longitudinal extent of the closure member carrier body.

9. The closure device as claimed in claim 1, wherein the closure member is mounted in the housing of the closure device so as to be displaceable relative to the opening exclusively linearly and exclusively in two mutually opposite directions.

10. The closure device as claimed in claim 1, wherein the guide element is formed as a rail, a rod or a body that is elongated parallel to a longitudinal extent of the closure member carrier body.

11. The closure device as claimed in claim 1, wherein the guide element receptacle of the yoke comprises two guide element receptacles, and the guide element comprises two guide elements that are guided by the two guide element receptacles.

12. The closure device as claimed in claim 11, wherein the guide element receptacles are arranged axis symmetrically to one another.

13. The closure device as claimed in claim 1, further comprising a carrier body receptacle of the yoke that fixes the closure member carrier body on the yoke, and the guide element receptacle and the carrier body receptacle are arranged in a fixed spatial position with respect to one another in the yoke.

* * * * *